(12) United States Patent
Yanagida et al.

(10) Patent No.: US 6,387,494 B1
(45) Date of Patent: May 14, 2002

(54) METHOD FOR PRODUCING ULTRA MICROPARTICLES AND ULTRA MICROPARTICLES

(75) Inventors: Shozo Yanagida, Kawanishi; Yuji Wada, Toyonaka, both of (JP)

(73) Assignee: Osaka University (JP)

( * ) Notice: Subject to any disclaimer, the term of this patent is extended or adjusted under 35 U.S.C. 154(b) by 0 days.

(21) Appl. No.: 09/465,750

(22) Filed: Dec. 17, 1999

(30) Foreign Application Priority Data

Mar. 5, 1999 (JP) .......................................... 11-058435

(51) Int. Cl.$^7$ ................................................ B32B 5/16
(52) U.S. Cl. ........................... 428/402; 75/345; 75/361; 75/369; 75/370; 75/10.1; 75/10.13
(58) Field of Search ........................... 428/402; 75/345, 75/361, 363, 370, 10.1, 10.13

(56) References Cited

U.S. PATENT DOCUMENTS

| 5,876,480 A | * | 3/1999 | Markowitz | .................... | 75/252 |
| 6,054,495 A | * | 4/2000 | Markowitz | .................... | 516/97 |
| 6,162,530 A | * | 12/2000 | Xieo | .................... | 428/291 |
| 6,235,540 B1 | * | 5/2001 | Siiman | .................... | 436/518 |

* cited by examiner

*Primary Examiner*—Leszek Kiliman
(74) *Attorney, Agent, or Firm*—Parkhurst & Wendel, L.L.P.

(57) ABSTRACT

A method for producing ultra microparticles including steps:
dissolving or dispersing at least one of metallic salts into a solvent to form a solution, and
irradiating a microwave to the solution to produce the ultra microparticles made of a metal in the metallic salt.

7 Claims, 5 Drawing Sheets

METHOD FOR PRODUCING ULTRA MICROPARTICLES AND ULTRA MICROPARTICLES

BACKGROUND OF THE INVENTION

1. Field of the Invention

This invention relates a method for producing ultra microparticles and ultra microparticles, and more particularly the same method and the same particles suitable for fundamental materials in a broad field of various catalysts such as photocatalyst and metallic catalyst, memory materials, luminescent materials, optoelectronics, etc.

2. Description of Related Art

Ultra microparticles having sizes of nm-scale (hereinafter, often abbreviated as "nm-size") made of semiconductor material or metallic material are regarded as important for fundamental materials in a broad field of various catalysts such as photocatalyst and metallic catalyst, memory materials, luminescent materials, optoelectronics, etc.

It is, however, very difficult for controlling particle size in nm-size and obtaining particles with small particle size-distribution. Thus, in the past, a method was employed that the growing of the particle size is inhibited by coexisting a surface-stabilizing agent such as a polymer, a surfactant, or a micelle with a dispersed quasi-stable semiconductor material or metallic material.

Besides, a method to control the particle size with matrix such as zeolite or clay mineral was employed. Moreover, a method to separate only desired microparticles with electrophoresis or size-excluding chromatograph after producing the ultra microparticles with a given particle size-distribution was employed.

However, the coexisting of a polymer, a surfactant or matrix such as zeolite results in condition-change of surfaces of the ultra microparticles or contamination of the ultra microparticles due to its additive. Consequently, the thus obtained ultra microparticles do not have desired characteristics when using them.

On the other hand, the method to separate with electrophoresis results in complicating an equipment for producing the ultra microparticles and their producing process, and rising up their producing cost.

Employing the above methods, microparticles with sub-nm size can be obtained, but the ultra microparticle with nm-size can not.

SUMMARY OF THE INVENTION

It is an object of the present invention to provide a producing method capable of obtaining the ultra microparticles with nm-size in ease and good reproducibility, and provide the ultra microparticles obtained via the producing method.

This invention relates to a method for producing ultra microparticles comprising steps:

dissolving or dispersing at least one of metallic salts into a solvent to form a solution, and irradiating a microwave to the solution to produce the ultra microparticles made of a metal in the metallic salt.

These inventors have been intensely studied to obtain the nm-sized ultra microparticles. As a result, they found that by irradiating a microwave with a given intensity to a solution including a melted metallic salt, the nm-sized ultra microparticles can be produced in a short time. The present invention is realized on the above finding.

FIG. 1 is a graph showing a particle size-distribution of metallic Ni particles obtained from the producing method according to the present invention. As is apparent from FIG. 1, the particle size-distribution of metallic Ni particles shows a peak at a particle size of 7 nm and has an average particle size of 7 nm. Thus, according to the present invention, the ultra microparticles with nm-size can be easily produced.

The reason capable of easily producing the ultra microparticles with nm-size as above mentioned is not clear, but it is considered as follows:

When a microwave is irradiated to a dissolved or dispersed solution of a metallic salt, the metallic salt is excited absorbing the microwaves. As a result, the metallic salt may be reduced and resolved to produce colloids.

Herein, the above microwave in the present invention has a frequency of 2.45 GHz.

BRIEF DESCRIPTION OF THE DRAWINGS

The invention will be more particularly described with reference to the accompanying drawings.

DESCRIPTION OF THE PREFERRED EMBODIMENTS

Figure 1:
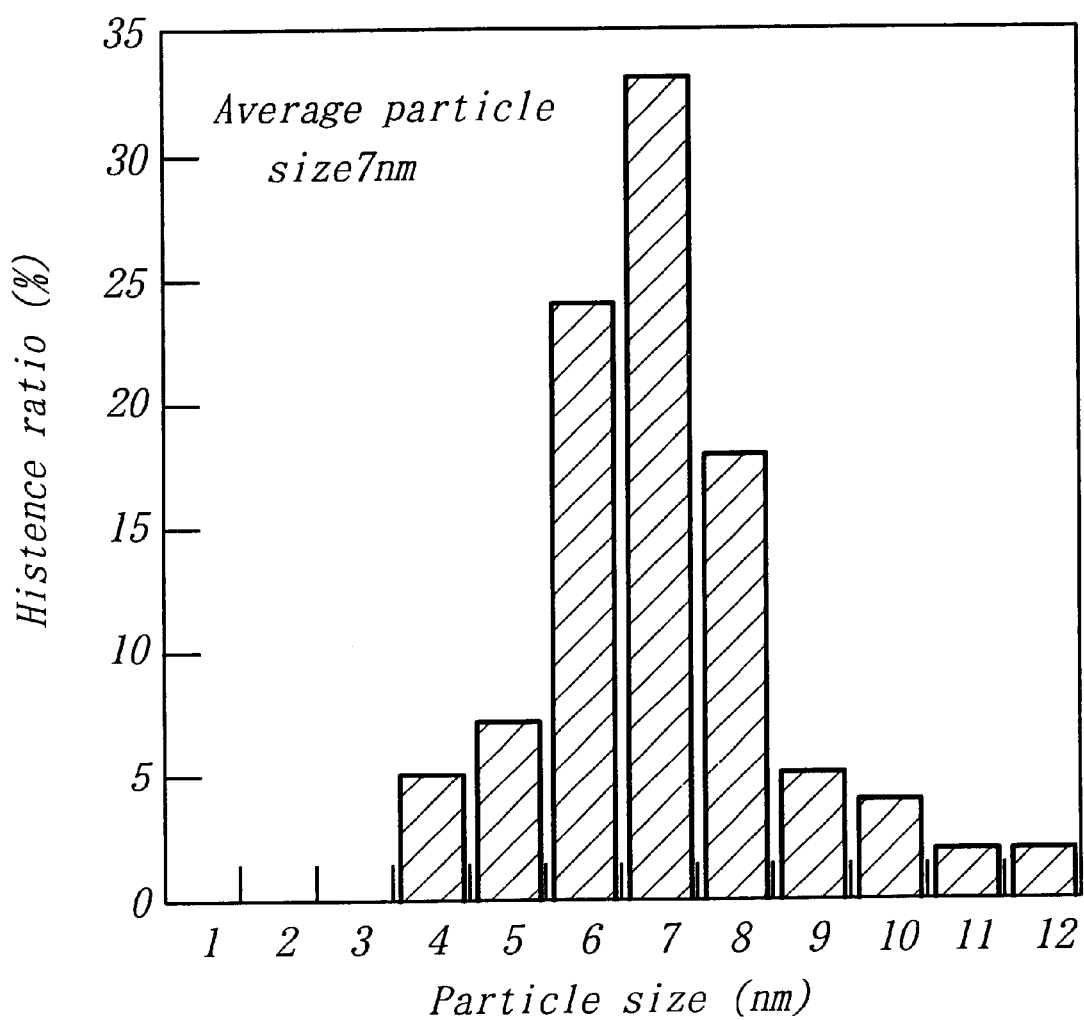
FIGS. 1 is a graph showing a particle size-distribution of Ni-ultra microparticles obtained from the producing method according to the present invention.

The invention will be described in detail as follows, with reference to the above drawings.

The producing method of the present invention requires to use a dissolved or dispersed solution of at least one of metallic salts.

The metallic salts in the present invention are not restricted. Any metallic salts may be used depending upon metals constituting ultra microparticles obtained from the present invention. As the above metallic salts, for example, a hydroxide, a halide, a nitrate, a sulfate, an acetylacetonato etc. may be employed.

Concretely, when Zn is employed as a metal constituting the ultra microparticles, $Zn(OH)_2$ etc. may be employed. Besides, when Pb, Ni, Fe, Co, Ru, Ag, In etc. are employed as metals constituting the ultra microparticles, respectively, a hydroxide, a halide, a perchlorate, an acetylacetonato, a nitrate including the metal etc. may be employed.

Moreover, a solvent to dissolve or disperse the above metallic salt is not limited if it can dissolve or disperse the one. Concretely, ethylene glycol, alcohol-series, organic amine-series, N,N-dimethylformamide, dimethylsulfoxide, acetone or the like may be employed.

The combination of a metallic salt and a solvent and an amount of a metallic salt to a solvent determine the dissolution and the dispersion of the metallic salt for the solvent. Moreover, the amount of the metallic salt to dissolve or disperse into a solvent is prepared depending upon an amount of the ultra microparticles to be produced.

Particularly, when the ultra microparticles made of a single metal are produced, an organic solvent such as ethylene glycol, alcohol-series, organic amine-series, being reductive to the single metal, is used. Thereby, the metallic salt is effectively reduced and fine metallic colloid is produced by a subsequent microwave-irradiation. Consequently, the ultra microparticles made of the single metal can be produced.

The metallic salt to dissolve or disperse into a solvent is not always restricted to one. In accordance with metals constituting the ultra microparticles, plural metallic salts may be employed. Moreover, in using the above reductive organic solvent, plural kinds of ultra microparticles, each kind being made of the single metal from the metallic salts, can be produced at the same time.

In producing the ultra microparticles made of the single metal, into a dissolved or dispersed solution of the above metallic salt is preferably incorporated a catalyst such as chloroplatinic, chloroaurate, chlororhodium, or chloropalladium. Thereby, the degree of reducing the metallic salt is increased and the irradiation time of the microwave can be shorter.

The content of such a solid catalyst is not particularly limited, but is preferably 0.01–1 mol % to the metallic salt to dissolve or disperse into a solvent, more preferably 0.1–1 mol %. It enables the solid catalyst to exhibit the most effectively its effect.

According to the present invention, the ultra microparticles made of a metallic sulfide can be produced, too. The production of the ultra microparticles of a metallic sulfide requires to incorporate a substance including S-elements, that is, S-source in a dissolved or dispersed solution of a metallic salt as above mentioned. The reason to produce the ultra microparticles made of a metallic sulfide is not clear, but is considered that the metallic salt turns into its colloid and the S-source is resolved by a subsequent microwave-irradiation, and more the colloid and the resolved S-source are reacted each other.

Thiourea, thiocarbamine acid or the like may be exemplified as the S-source. The amount of the S-source to be incorporated is not particularly limited if it enables the S-source to react with the metallic salt as above-mentioned and form the metallic sulfide-ultra microparticles. Generally, the S-source is incorporated corresponding to the amount of the metallic salt so that the amounts of the metal and the S-element constituting the metallic sulfide coincides stoichiometrically.

In the present invention, a microwave is irradiated to the prepared solution as above-mentioned. The irradiation intensity of the microwave is not restricted if it enables fine colloid to be produced via reduction of the metallic salt.

However, the lower limited value of the irradiation intensity is preferably 0.005 W/cm$^3$, more preferably 0.01 W/cm$^3$. Thereby, the metallic salt can be effectively reduced and its fine colloid can be produced. Moreover, the irradiation time of the microwave can be shorter and the production time of the ultra microparticles can be shorten.

The upper limited value of the irradiation intensity is preferably 2 W/cm$^3$, more preferably 0.5 W/cm$^3$. If the upper limited value is larger than 2 W/cm$^3$, for example in producing the ultra microparticles made of a metallic sulfide, by-products besides the metallic sulfide are produced and the ultra microparticles made of highly purified metallic sulfide can not be obtained. Moreover, the larger irradiation intensity than the upper limited value dose not contribute the shortening of the production time and the controlling of the particle size of the ultra microparticles at all.

The irradiation time of the microwave is not limited if it enables the ultra microparticles to be produced. However, the lower limited value of the irradiation time is preferably two minutes, more preferably one minute. If the irradiation time is shorter than the lower limited value, the metallic salt is not sufficiently reduced and very fine colloid can not be produced.

Moreover, the upper limited value of the irradiation time is preferably five minutes, more preferably three minutes. If the irradiation time is larger than the upper limited value, the by-products are often produced in producing the ultra microparticles made of a metallic sulfide as above-mentioned. Besides, it dose not contribute the controlling of the particle sizes of the ultra microparticles at all.

The producing method of the present invention can be applied for producing every kind of ultra microparticles made of a metal.

For example, as the ultra microparticles made of a single metal are exemplified Ni—, Co—, Cu—, Zn—, Au—, Ag—, Pd—, Rh—, Ir-ultra microparticles. As the ultra microparticles made of a metallic sulfide are exemplified ZnS—, CdS—, PbS—, NiS—, FeS—, CoS—, RuS—, AgS—, InS-ultra microparticles.

According to the present invention, the ultra microparticles made of a metal or a metallic sulfide can be produced in particle size of 0.5–50 nm or 0.5–10 nm, respectively.

EXAMPLES

This invention is concretely described on the examples, with reference to the drawings.

Example 1

In this example, the ultra microparticles made of a Ni metal was produced.

The amount of 0.0266 g of Ni(OH)$_2$ was dispersed into 2 mL of ethylene glycol. Then, to the dispersed solution are added and dissolved 0.133 g of polyvinylpyrrolidone as a stabilizing protectant for the ultra microparticles produced and 6.72×10$^{-4}$ g of chloroplatinic as a catalyst.

The microwave of a intensity of 0.01 W/cm$^3$ from a microwave oven was irradiated to the thus obtained solution for five minutes. As a result, the Ni-dispersed solution turn into burnt umber in its color.

When the solution was dried and the remained products thereof were observed through a TEM, it turned out that ultra microparticles of nm-size were produced. Then, when the remained products were identified through electron beam diffraction, it turned out that they were equant Ni-metal.

Then, 100 from among the ultra microparticles in the TEM photograph were chosen at random and their particle size-distribution was investigated. As a result, a particle size-distribution as shown in FIG. 1 was obtained. It has a peak at a particle size of 7 nm and an average particle size of 7 nm.

Examples 2 and 3

Figure 2:
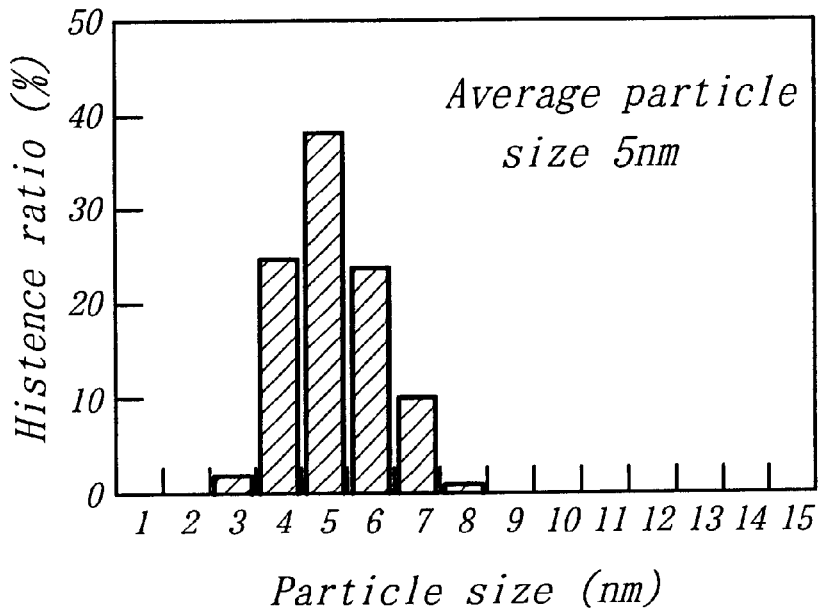
FIG. 2 is a graph showing a particle size-distribution of Ni-ultra microparticles when changing an irradiation time of a microwave in the present invention.
Figure 3:
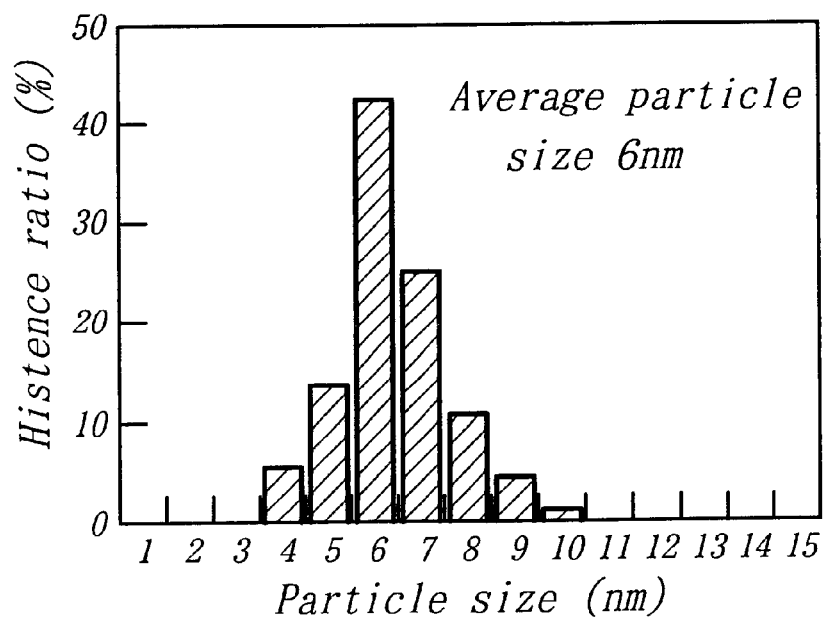
FIG. 3 is a graph showing another particle size-distribution of Ni-ultra microparticles when changing a irradiation time of a microwave in the present invention.

Except that the irradiation time of the microwave was two minutes and three minutes, the ultra microparticles were produced as in Example 1. When the thus obtained Ni particles were measured about its particle size distribution by a laser scattering method, particle size-distributions as shown in FIGS. 2 and 3 were obtained. They have peaks at particle sizes of 5 nm and 6 nm, and average particle-size of 5 nm and 6 nm, respectively. That is, it turns out that in this example, Ni-ultra microparticles were obtained.

Example 4

Figure 4:
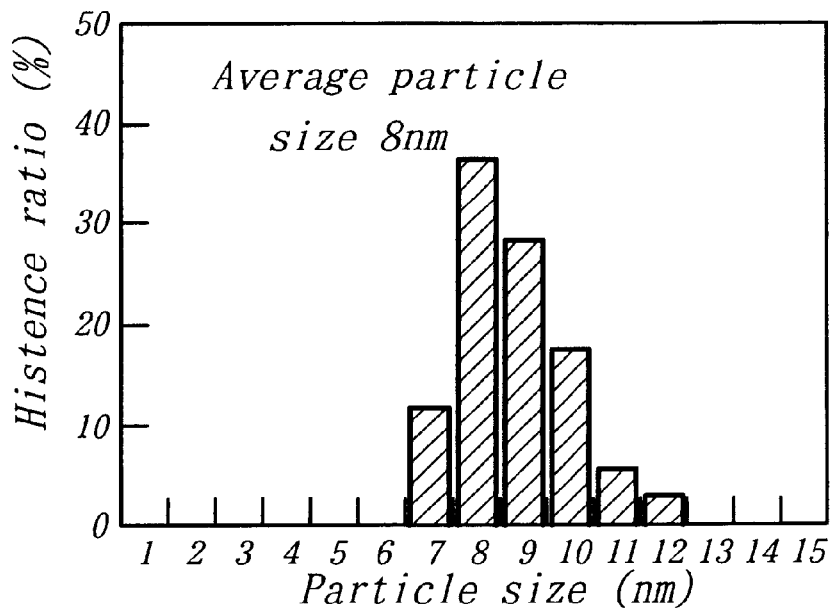
FIG. 4 is a graph showing a particle size-distribution of Ni-ultra microparticles when changing an irradiation intensity in the present invention.

Except that the intensity of the microwave was 0.025 W/cm$^3$ and the irradiation time was three minutes, the ultra microparticles were produced as in Example 1. When the thus obtained Ni-ultra microparticles were measured about its particle size-distribution by a laser scattering method, particle size-distribution, having a peak at a particle size of 8 nm and an average particle size of 8 nm, was obtained as shown in FIG. 4.

Examples 5 to 7

Except that Ni(Cl)$_2$, Ni(SO)$_4$, Ni(Br)$_2$ instead of Ni(OH)$_2$ were employed as the metallic salt, respectively, the ultra microparticles were produced as in Example 1. When the remained products were identified by electron beam diffraction and X-ray diffraction, they turned out to be equent Ni-microparticles.

Figure 5:
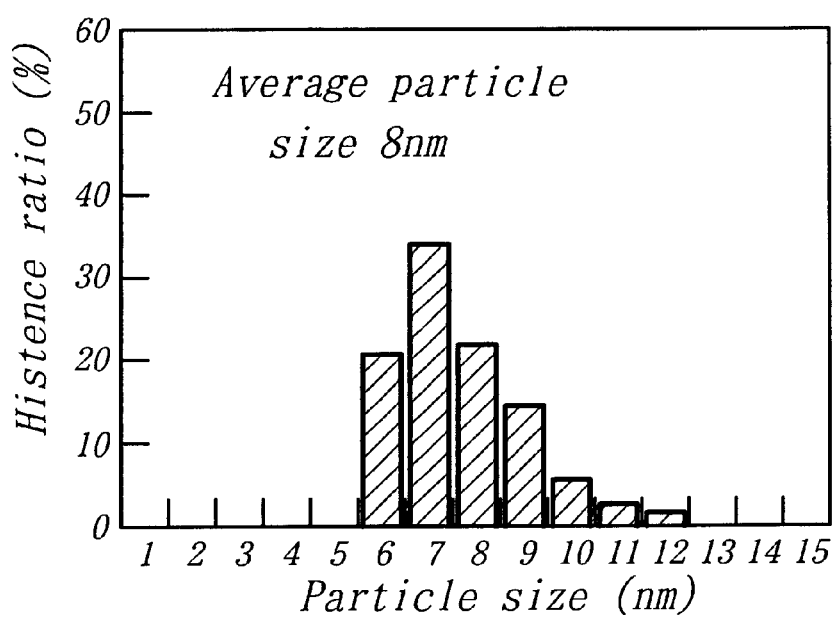
FIG. 5 is a graph showing a particle size-distribution of Ni-ultra microparticles when using another metallic salt in the present invention.
Figure 6:
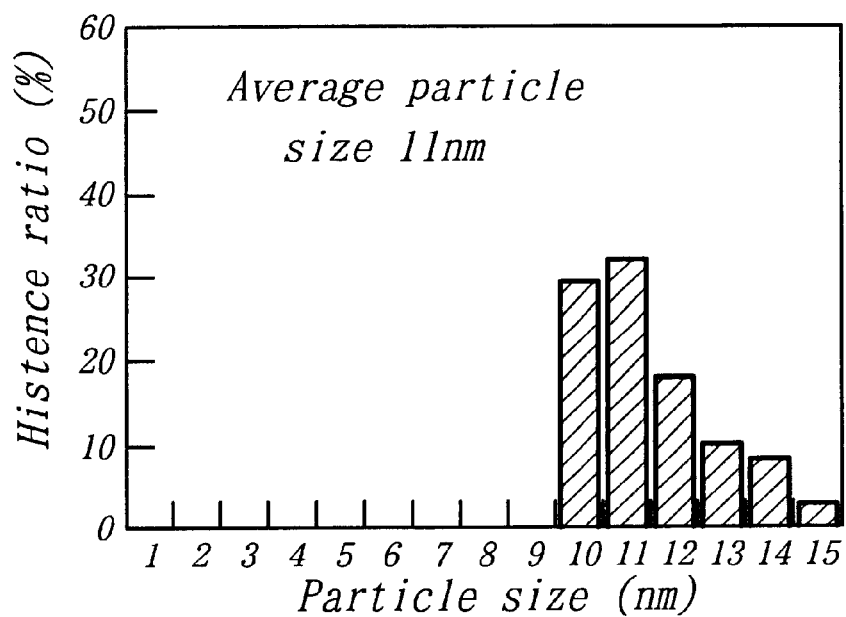
FIG. 6 is a graph showing another particle size-distribution of Ni ultra microparticles when using still another metallic salt in the present invention.
Figure 7:
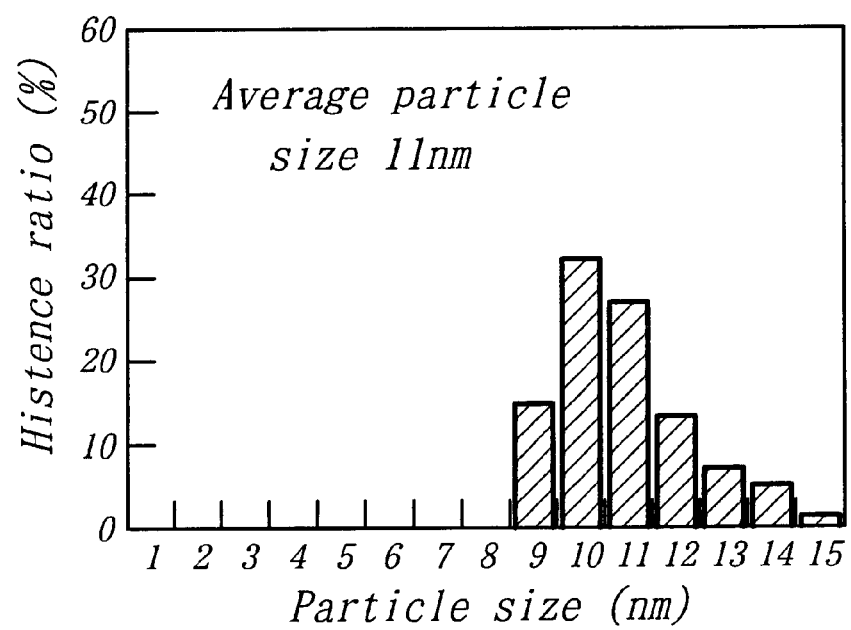
FIG. 7 is a graph showing still another particle size-distribution of Ni ultra microparticles when using further metallic salt in the present invention.

Then, the particle sizes of the Ni-microparticles were investigated by a laser scattering method. As a result, particle size-distributions were obtained as shown in FIGS. 5 to 7. The average particle sizes of the Ni-microparticles were 8 nm, 11 nm, 11 nm, respectively.

As is apparent from Examples 1 to 7, the ultra microparticles of nm-size can be produced according to the present invention. Moreover, it is clear from Examples 1 to 3 that the prolonging of the irradiation time tends to increase the particle sizes. Furthermore, it is apparent from Examples 3 and 4 that the increasing of the intensity of the microwave enlarges the particle sizes, too. As is apparent from Examples 1 and 5 to 7, the changing of Ni-metallic salt causes to change the particle sizes of the obtained Ni-ultra microparticles.

Examples 8 to 15

In these Examples, the ultra microparticles made of a metallic sulfide were produced.

Acetic cadmium of 2.5 mM was used as the metallic salt and thiourea of 2.5 mM was used as the S-source. These were dissolved in 10 mL of N,N-dimethylformamide to form a solution.

Then, a microwave of an intensity of 0.036 W/cm$^3$ from a microwave oven on the market was irradiated to the solution for 15, 18, 21, 24, 27, 30, 31, and 41 seconds, respectively. As a result, the solution turned into yellow from transparent in color. When the solution was observed by a laser scattering method, the ultra microparticles of nm-size turned out to be produced.

Then, when the ultra microparticles were identified by electron beam diffraction, hexagonal CdS turned out to be formed therein.

Figure 8:
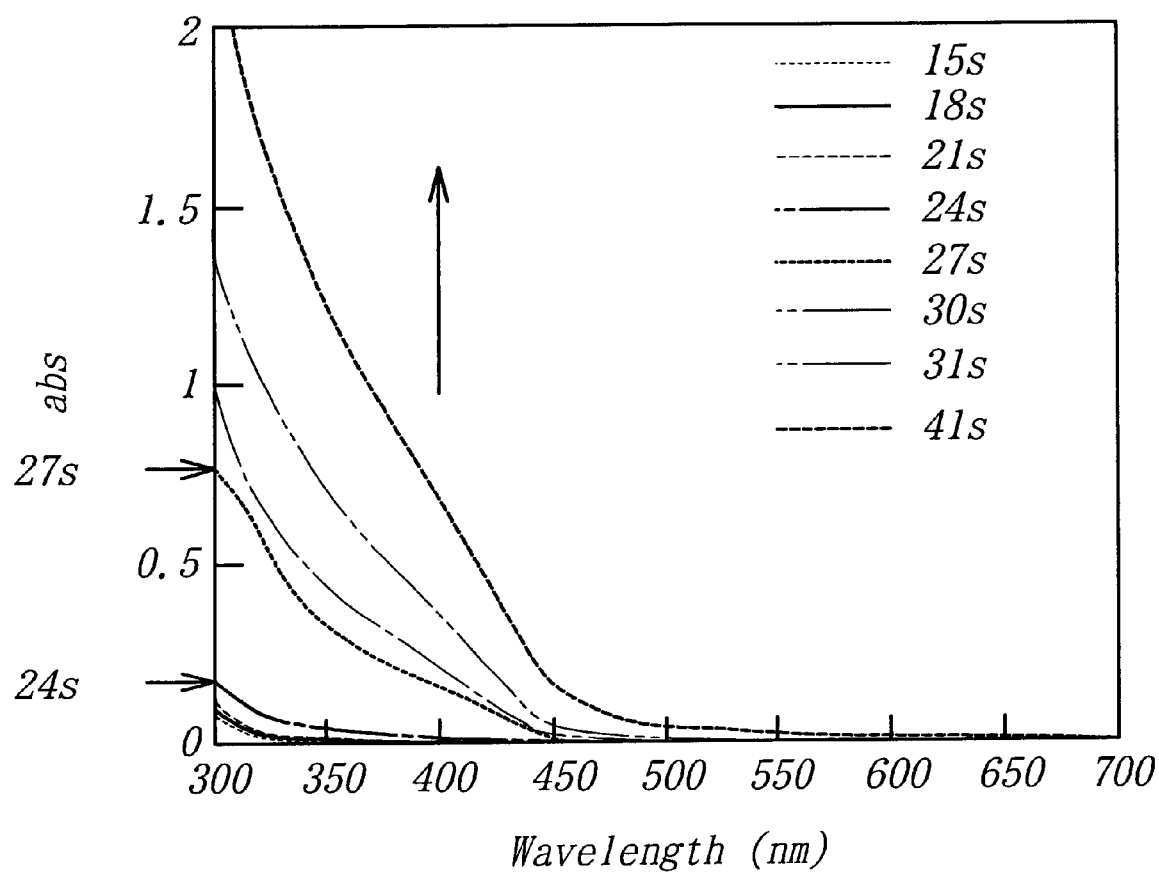
FIG. 8 is a graph showing absorption spectra of CdS-ultra microparticles obtained from the producing method according to the present invention.

FIG. 8 shows absorption spectra of Examples 8 to 15. As is apparent from FIG. 8, the absorption onsets of the absorbing spectra appeared in a shorter side than 480 nm.

Thus, since an absorption onset of an absorbing spectrum depends on a particle size, the ultra microparticles have average particle sizes of about 1–10 nm with some inaccuracy.

As the irradiation time is prolonged, the absorption onsets are shifted to a long wavelength side and the particle sizes of the CdS-ultra microparticles are increased.

Although the present invention was described in detail with reference to the above examples, this invention is not limited to the above disclosure and every kind of variation and modification may be made without departing from the scope of the present invention.

Since high energy of microwave is employed in the present invention, the ultra microparticles of nm-order can be easily produced in a short time.

What is claimed is:

1. A method for producing ultra microparticles comprising the steps of: dissolving or dispersing at least one of metallic salts into a solvent to form a solution, and irradiating the solution with microwaves to produce the ultra microparticles made of a metal in the metallic salt.

2. A method for producing ultra microparticles as defined in claim 1, wherein the solvent is a reductive organic solvent for the metallic salt, whereby the ultra microparticles made of a single metal are produced.

3. A method for producing ultra microparticles as defined in claim 2, wherein plural metallic salts are dissolved or dispersed into the organic solvent, whereby plural kinds of ultra microparticles, each kind being made of the single metal in the metallic salt, are produced at the same time.

4. A method for producing ultra microparticles as defined in claim 2 or 3, wherein a catalyst is incorporated into the solution.

5. A method for producing ultra microparticles as defined in claim 1, wherein a substance including S-elements is dissolved in the solution, whereby the ultra microparticles made of a metallic sulfide are produced.

6. A method for producing ultra microparticles as defined in claim 1, wherein the irradiation-intensity of the microwave is 0.005–2 W/cm$^3$.

7. A method for producing ultra microparticles as defined in claim 1, wherein the irradiation-time of the microwave is 0.1–30 minutes.

* * * * *